(No Model.) 9 Sheets—Sheet 1.

J. P. WRIGHT.
MECHANISM FOR MAKING MATCH BOXES.

No. 543,714. Patented July 30, 1895.

Witnesses:
Jas. E. Hutchinson.
Chas. J. Williamson.

Inventor
Jacob P. Wright, by
Prindle & Russell, his Attys.

(No Model.) 9 Sheets—Sheet 2.

J. P. WRIGHT.
MECHANISM FOR MAKING MATCH BOXES.

No. 543,714. Patented July 30, 1895.

Fig. 3.

Witnesses
Chas. J. Williamson.
Jas. E. Hutchinson.

Inventor
Jacob P. Wright, by
Brindle & Russell his attys (No Model.) 9 Sheets—Sheet 3.

J. P. WRIGHT.
MECHANISM FOR MAKING MATCH BOXES.

No. 543,714. Patented July 30, 1895.

Witnesses
E. J. Williamson,
Jas. E. Hutchinson

Inventor
Jacob P. Wright,
by Prindle & Russell, his attys

Fig. 6.

(No Model.) 9 Sheets—Sheet 7.

J. P. WRIGHT.
MECHANISM FOR MAKING MATCH BOXES.

No. 543,714. Patented July 30, 1895.

Witnesses:
Jas. E. Hutchinson.
Chas. J. Williamson.

Inventor
Jacob P. Wright, by
Crindle and Russell, his attys.

(No Model.) 9 Sheets—Sheet 8.

J. P. WRIGHT.
MECHANISM FOR MAKING MATCH BOXES.

No. 543,714. Patented July 30, 1895.

Witnesses:
Jas. E. Hutchinson.
Chas. J. Williamson.

Inventor
Jacob P. Wright by
Grindle & Russell his attys

UNITED STATES PATENT OFFICE.

JACOB P. WRIGHT, OF NEW HAVEN, CONNECTICUT, ASSIGNOR TO THE DIAMOND MATCH COMPANY, OF CHICAGO, ILLINOIS.

MECHANISM FOR MAKING MATCH-BOXES.

SPECIFICATION forming part of Letters Patent No. 543,714, dated July 30, 1895.

Application filed June 2, 1894. Serial No. 513,259. (No model.)

*To all whom it may concern:*

Be it known that I, JACOB P. WRIGHT, of New Haven, in the county of New Haven, and in the State of Connecticut, have invented certain new and useful Improvements in Mechanism for Making Match-Boxes; and I do hereby declare that the following is a full, clear, and exact description thereof, reference being had to the accompanying drawings, in which—

Letters of like name and kind refer to like parts in all of the figures.

The object of this invention is to enable match-boxes of different depths to be constructed upon one machine; and to such end my invention consists in the mechanism employed, substantially as and for the purpose hereinafter specified.

In the practical application of my invention I employ a main or supporting frame which consists of a bed-plate A, that at each end is provided with two legs B and B, as shown. Secured to such bed, at a short distance from one end, are two plates C and C, which are arranged vertically and in parallel lines, and within the same and within two brackets D and E, that are secured to and extend upward from opposite ends of said bed, is journaled a shaft F, which upon one end is provided with a pulley G, that enables it to be connected with and driven from a source of power. Said shaft is the main or driving shaft of the machine, and from it, directly or through intermediate devices, are set in motion the movable parts of such machine.

Near the rear upper portion of the frame-plates C and C are journaled two horizontal feed-rollers H and H', of ordinary construction, the lower of which rollers H runs in stationary bearings, while the upper roller H' is movable vertically and is held in yielding contact with said lower roller by means of springs $h$ and $h$, one of which is placed between the journal-box $h'$ at each end of said roller H' and a fixed or adjustable bearing above the same.

In front of the rollers H and H' are two other materially larger rollers I and K, which are also journaled horizontally, with the upper side of the lower roller I upon a line horizontal with the upper side of said roller H. The roller K is journaled within boxes L and L, which are moved downward and held in position by means of set-screws $l$ and $l$, while by the action of a spring $l'$ placed beneath said boxes L and L said roller K is held with a yielding pressure at the upper limit of its motion.

Figure 1:
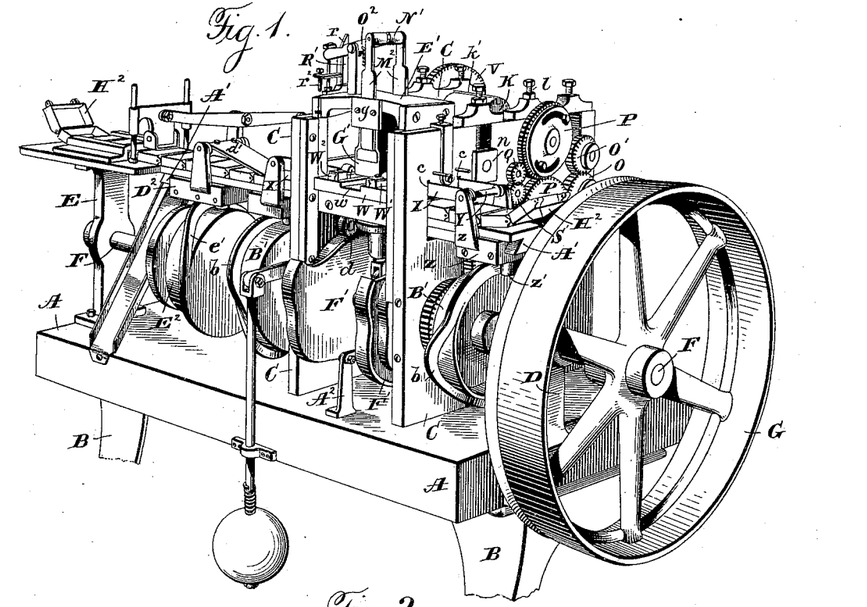
Figure 1 is a perspective view of my machine.
Figure 2:
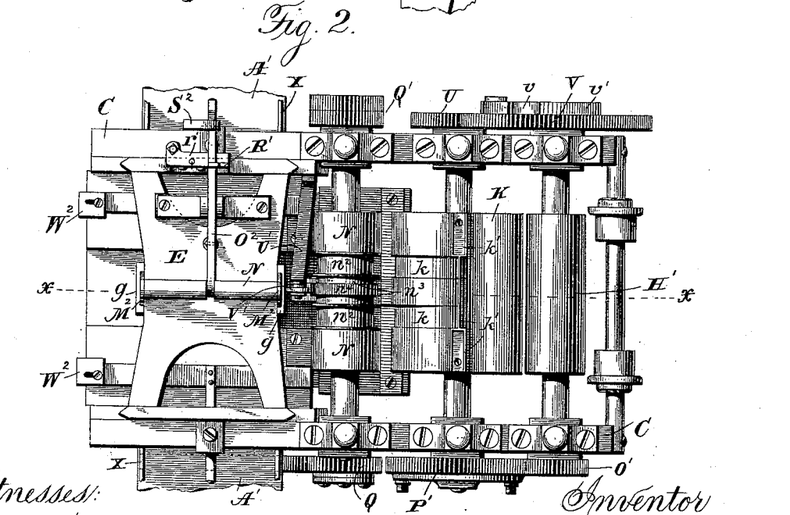
Fig. 2 is a plan view of a portion of the same from the upper side.
Figure 3:
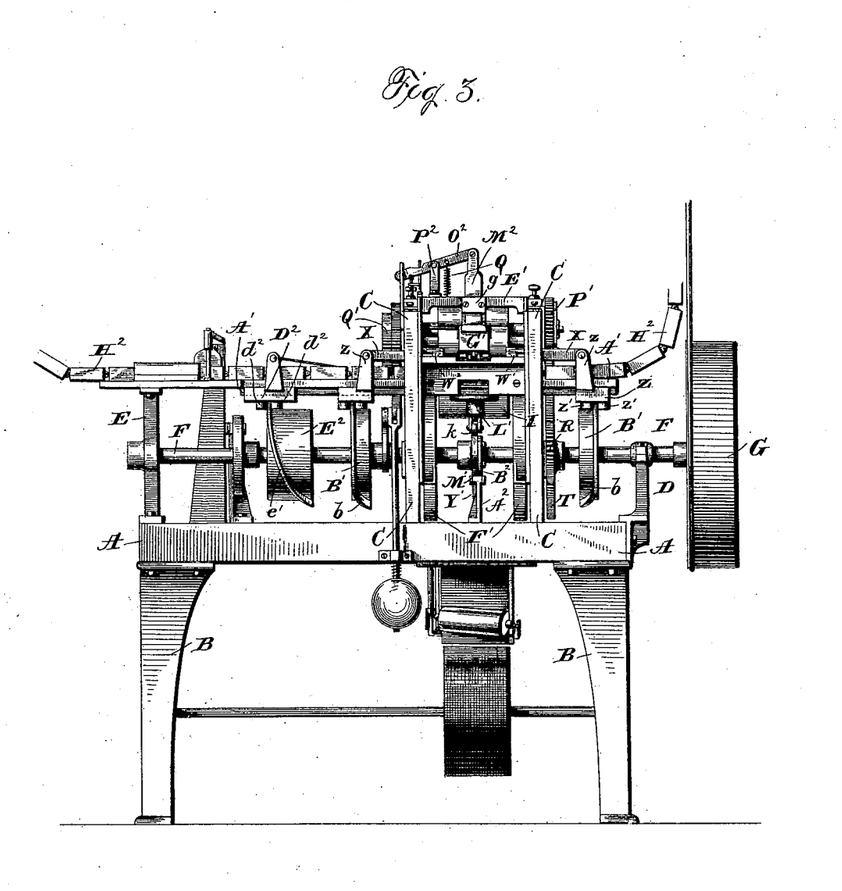
Fig. 3 is an elevation of said machine from the front.
Figure 4:
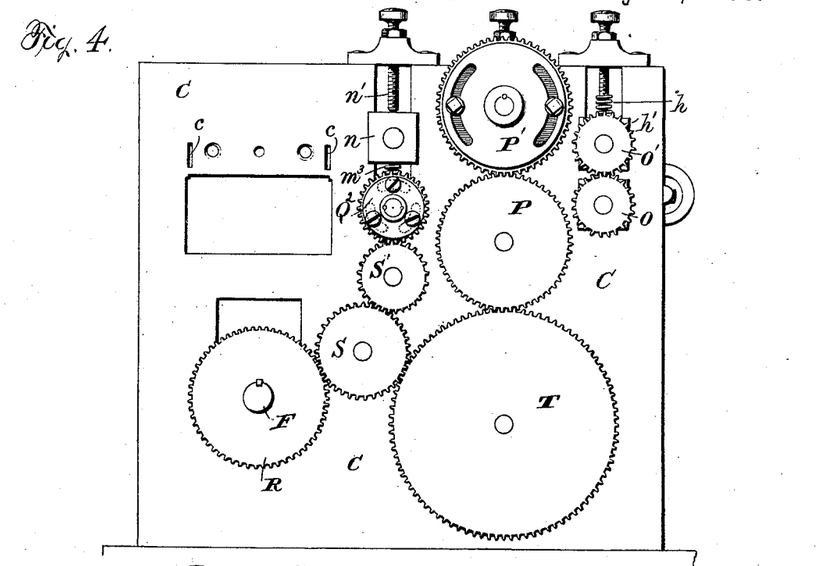
Fig. 4 is a side elevation, portions being removed to show the arrangement of operating-gears.
Figure 5:
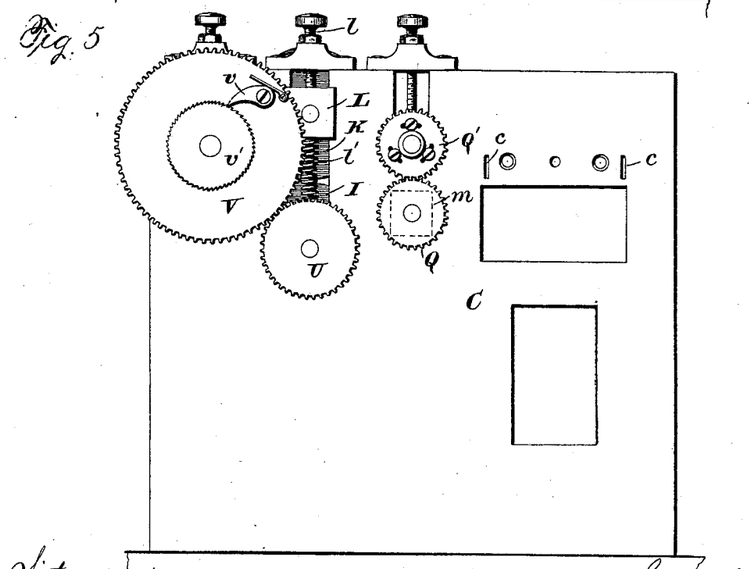
Fig. 5 is a like view to show the gears at the opposite side.
Figure 6:
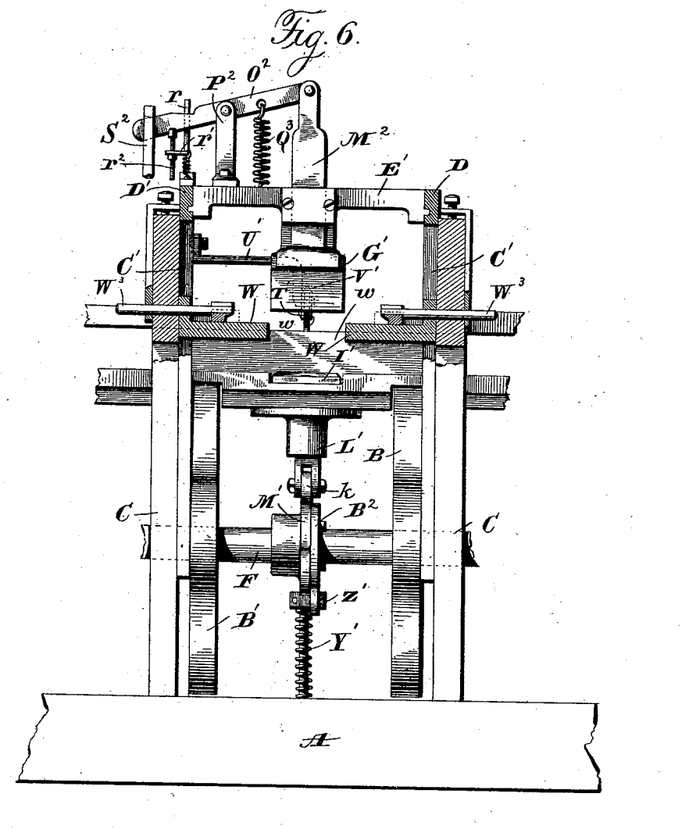
Fig. 6 is a view, partly in cross-section, showing in elevation the box-forming mechanism.
Figure 7:
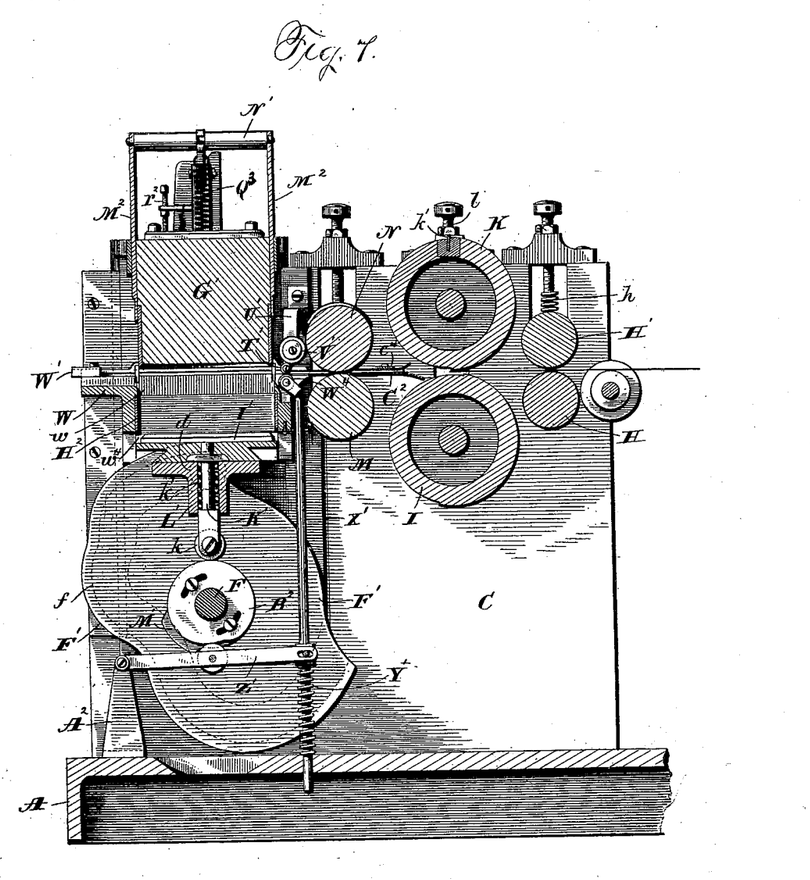
Fig. 7 is a longitudinal section upon line $x\ x$ of Fig. 2, showing the feeding, cutting, and box-forming devices.
Figure 8:
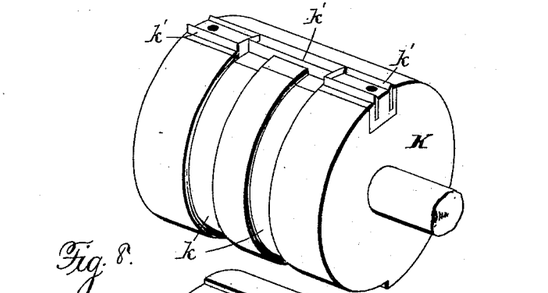
Fig. 8 is a perspective view of the feed-rolls separated from each other.
Figure 9:
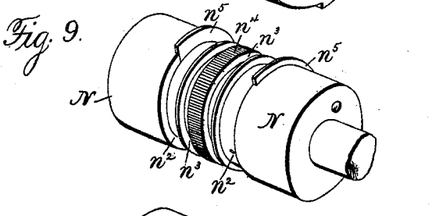
Figs. 9 and 10 are like views, respectively, of the upper and lower cutting-rolls.
Figure 10:
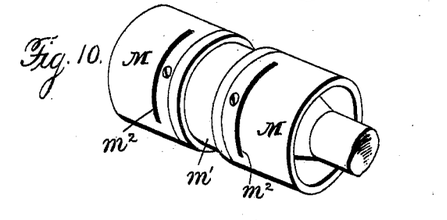
Figure 11:
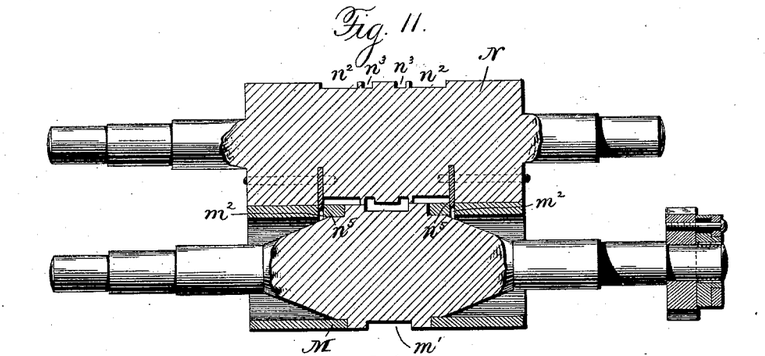
Fig. 11 is a longitudinal section of said rolls as combined for use.
Figure 12:
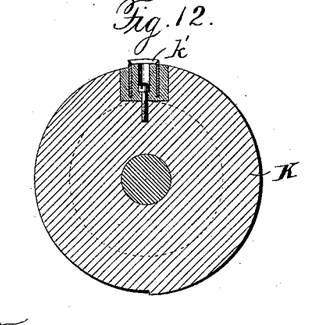
Fig. 12 is a cross-section of one of the feed-rolls containing a supplemental cutter.

The rollers I and K are intended for use both as feed and cutting rolls, and one-half of the periphery of each is cut away longitudinally, so as to bring its surface below the remaining surface a distance radially equal to about twice the thickness of the paper to be operated upon. Said roller K has two peripheral grooves $k$ and $k$, which extend inward a short distance and enable the glue-printed portion of the paper to pass through without contact, while at one edge of the elevated portion of its periphery said roller is provided with a cutter $k'$, which extends lengthwise of the same and is confined within a suitable groove formed for such purpose. In the construction of some boxes said cutter is straight, while for other boxes it has the branched form at each end seen in Fig. 2.

At a short distance in front of the rollers I and K are journaled two other rollers M and N, which have about one-half their diameter, the lower of which M is journaled within stationary boxes $m$ and $m$, while the upper roller N is journaled within vertically-movable boxes $n$ and $n$, that are held at the lower limit of their motion by means of set-screws $n'$ and $n'$ and at the upper limit of such motion by springs $m^3$ and $m^3$ placed between said boxes $m$ and $m$. The upper roller N is provided with peripheral grooves $n^2$ and $n^2$, which coincide with the grooves $k$ and $k$ of the roller K, and, like the latter, permit of the passage of the glued portions of the paper blanks, and between such grooves has two smaller peripheral grooves $n^3$ and $n^3$, between which the surface $n^4$ is provided with fine teeth, the object of which will be hereinafter explained, while at the outer edge of each of said grooves $n^2$ are provided two cutters $n^5$ and $n^5$, that are arranged circumferentially within opposite sides of said roller, project about one-sixteenth of an inch above its surface, and have each a length equal to twice the depth of the deepest box to be made. The lower roller M is provided with a circumferential groove $m'$, which coincides in width and location to the toothed section $n^4$ of the roller N, and at suitable points has circumferential recesses $m^2$ and $m^2$, that coincide with and operate to receive the cutters $n^5$ and $n^5$ of the roller N.

The rollers H and H' are connected together by means of two meshing gear-wheels O and O' which are secured upon the journals at the corresponding ends of each. The rollers I and K are in like manner connected by means of two gear-wheels P and P' that are connected with the journals at one end of the same, while at the opposite end of the machine two gear-wheels Q and Q' operate to connect together the rollers M and N. The gear-wheel P' is made rotatively adjustable with reference to its roller in order that the relative peripheral position of such roller may be varied with reference to the lower roller with which it acts.

Motion is imparted to the rollers from the driving-shaft F by means of a gear-wheel R which is secured upon the same just outside of one of the frame-plates C, and meshes with an intermediate wheel S that is journaled upon the side of such plate. Said wheel S meshes with a gear-wheel S', also journaled on the side of said plate, which meshes with a gear-wheel $Q^2$ upon one end of the roller M, that, like the gear P', is rotatively adjustable relative to its roller. The wheel S is geared to a second intermediate wheel T, which latter is journaled upon the plate C below and in a line vertically with the rollers I and K, and meshes with the gear-wheel P. The connections named serve to impart motion from the shaft F to the rollers I, K, M, and N, while for the rollers H and H' a gear-wheel U is secured upon the journal of the roller I, and another meshing-wheel V is attached to the journal of the roller H'. For reasons hereinafter explained, said wheel V is connected with said roller H' by means of a pawl $v$ and ratchet-wheel $v'$, so as to enable said rollers H and H' to be rotated faster than and in the same direction that they are driven.

Between the rollers M and N and the front of the machine is a horizontally-arranged table W, which has its upper face upon a line with the upper sides of the rolls H, I, and M, and is provided with a central opening $w$ that corresponds in size and shape to the horizontal dimensions of the box to be formed, and is arranged with its longest diameter in a line extending from the front side to the back side of the machine. A groove $w'$, having the same width as said opening, extends through the same from the front to the rear edge of said table, while two other grooves $w^2$ and $w^2$, having a width of about one-eighth of an inch, and a depth equal to that of said grooves $w'$, extend lengthwise of said table at the front and rear ends of said opening $w$, and at their ends coincide with openings $c$ and $c$ within the plates C and C, which latter openings have each the same horizontal dimensions as its coinciding groove $w^2$ and vertically measures about three-fourths of an inch.

Fitted into and adapted to slide longitudinally within each groove $w^2$ and its opening $c$ is a correspondingly-shaped bar X, which has its projecting end connected with the corresponding end of the other bar X by means of a pin Y that passes through such ends and through two lugs $z$ and $z$, which project upward from a slide Z that is fitted upon and adapted to be moved longitudinally over a way A', which way projects horizontally from the adjacent frame-plate C in a line with said grooves $w^2$ and $w^2$ over the shaft F. A pulley B', provided with a peripheral cam-flange $b$, is located beneath said slide and has its said flange engaged by two rollers $z'$ and $z'$, so that by the rotation of such cam-pulley said slide, with its pair of bars X and X, will be moved so as to cause the latter at a predetermined moment to pass inward until their inner ends are a predetermined distance beyond the adjacent side of the table-opening $w$ and then withdraw them to their outer positions.

Upon the upper side of the table W are two parallel straight bars W' and W' that extend from front to rear thereof, and being placed outside of the die-opening $w$ operate to engage the side edges of the box-blank and properly guide it to position. The inner edges of the bars are made to overhang and thus prevent the blank rising from the table, and blocks W² and W² to engage the front edge of the blank and thus limit or stop its feed. Said bars W' and W' are adapted to be adjusted laterally to suit blanks of various widths, and they are provided with round rods or pins W³ and W³, which extend outward through openings in the side plates C and C and serve to hold and guide the bars when adjusted.

Within the inner face of each frame-plate C, in a line from front to rear with the table-opening $w$, is formed a vertical way C', which receives and contains a slide D' that is adapted to be moved longitudinally within certain limits and at its upper end is rigidly connected with the upper end of the opposite slide D' by means of an H-shaped cross-bar E', which extends between and is bolted to each of such parts. Pivoted upon the inner face of each slide, below the table W, is a roller $d$, which is adapted to be engaged by a groove $f$ that is formed within the contiguous face of a cam F', which cam is secured upon and revolves with the driving-shaft F and operates to give to said slides a downward movement of about one-fourth the length of their travel, a brief period of rest, a farther downward movement to the limit of such motion, and then an upward movement to their normal position, where they rest while said shaft completes its revolution, such movements of said slides being made while said shaft is passing through one half of a revolution and its long rest occupying the second half of the rotation.

Secured upon and extending downward from the center of the cross-bar E' is a plunger G' which at its lower end corresponds in shape to the table-opening $w$ and has such dimensions horizontally that when passed into such opening there will be left between each of the sides of the latter and the contiguous side of said plunger a space equal to or slightly greater than the thickness of the paper-board to be used in the construction of the boxes.

Within the table W, upon a line with the upper side of the way A', is provided a transverse opening $w^3$ which coincides in a line from front to rear with the opening $w$ and has such width and height as to permit of the passage through the same of a chain of box-holders H² and H², of usual construction, each of which holders interiorly corresponds in horizontal size and shape to the like features of said opening $w$, and when in position beneath the latter forms a continuation of the same. Within the lower end of the table-opening $w$ is located a plate I', which horizontally has the form of and is substantially the size of such opening and has its upper corners beveled off at an angle of about forty-five degrees. Such plate is contained within a corresponding recess $w'$, formed in the bottom of the transverse opening $w$, and at its center is connected with a rod K', which from thence extends downward through a suitable guide L' and at its lower end is provided with a roller $k$ that bears upon and engages with the periphery of a cam M', which cam is secured to and revolves with the shaft F and has such form as to cause said plate or former I' to be moved quickly upward until it nearly impinges upon the plunger G' as the latter reaches the lower limit of its motion, and after holding said former in elevated position for an instant permit the same to be returned to its lower normal position by means of the downward pressure of a spring $k'$.

Fitted within a guide $g$ upon the front and rear sides each of the plunger G' is a plate M² which extends upward and at its upper end is connected by a cross-bar N' with the upper end of the opposite plate, which cross-bar is pivoted upon one end of a lever O², that is in turn pivoted centrally upon a stud P² which projects upward from the cross-bar E', the arrangement being such as to enable said plates to be moved longitudinally upward and downward with reference to said plunger by the movements of said lever upon its pivotal bearing. The lower ends of said plates, which are to operate as strippers for removing a box from the plunger G', correspond in thickness to twice the thickness of the paper-board to be used and in transverse length have about four-fifths the width of the table-opening $w$.

The strippers M² are intended to move quickly to their lower limit of motion just as the plunger reaches the lower limit of its travel, and, therefore, after the box has been folded upon the plunger, and to be moved to the upper limit of their motion as said plunger passes from its mid-position to the limit of its upper motion. This is accomplished by placing a spring Q³ between the inner end of the lever O' and the cross-bar E' to cause said strippers to automatically move to and remain in their lowermost position when left free to act, and pivoting a spring-pressed pawl R' upon said cross-bar E' in such position as to cause its engaging end $r$ to engage with the outer portion of said lever when said strippers are in an elevated position and lock them therein. An arm $r'$, projecting forward from such pawl, is provided within its outer end with a screw $r^2$, which passes vertically downward, and by a downward movement of said cross-bar impinges upon the upper edge of the frame-plate C and causes said pawl to be tilted rearward, so as to release said lever and permit said spring Q³ to move said strippers downward to their normal position. By the longitudinal adjustment of said screw the release of said strippers may be hastened or retarded with reference to the movement of the plunger. The strippers are set in their upper position by means of a lug S², which extends upward from the frame-plate C in position to engage the outer end of the lever O' when the plunger has risen a predetermined distance, after which the further movement of said plunger will cause said lever end to be relatively depressed until it is engaged by the spring-pawl R' and locked in place. The employment of the spring $Q^3$ to actuate the strippers instead of the cams commonly used for the purpose is chiefly important in that where a change in the depth of box being manufactured is made no change in the stripper-actuating mechanism is necessary, as the spring automatically carries the strippers to the box edges whatever be their height. Where a cam is used to operate the strippers to place them in position to engage a blank, it will be apparent that as the movement of the strippers by the cam is always within the same limits if it should be attempted to make a box shallower than the one for which the movement of the cam is designed the strippers in their downward movement will fall short of reaching the top edge of the box-blank when the plunger reaches its lower limit of motion, and hence cannot prevent the lifting of the folded blank to the upper part of the holder by the plunger as the latter rises. To satisfactorily and perfectly perform their work, it is necessary that the strippers be in engagement with the box-blank at the instant the plunger begins to rise, and this is only made possible in a machine adapted to make boxes of different depths either by substituting one cam for another, or, as is far more preferable, by providing for a variable movement of the stripper-actuating devices. The spring $Q^3$ enables this variable movement to be given, and, almost instantaneously after it is freed from the latch devices, it moves the strippers into engagement with the top edges of the box-blank whatever be its height.

For specific feeding purposes, hereinafter explained, a toothed roller T' is journaled upon a bracket-arm U', secured to the frame-plate C in such position as to bring it immediately over the transverse center of the path traveled by the paper-blank just in rear of the table-opening $w$, and is adapted to be rotated by means of a toothed intermediate wheel V', which is also journaled upon said bracket and meshes with said roller and with the toothed surface $n^4$ of the roller N, so that by the rotation of the latter said roller T' is caused to rotate in the same direction. Below the roller T' is a smooth-faced roller $W^4$, which is journaled within the upper end of a rod $x'$, that from thence extends downward within suitable supports and is adapted to have a certain amount of longitudinal motion, so as to cause its periphery to be brought nearly into contact with the periphery of said roller T' when desired. A spring Y' operates to hold said rod with a yielding pressure, with its roller normally at the upper limit of its motion, while by means of a horizontally-arranged lever Z', that has one end loosely connected with said rod and its opposite end pivoted upon a bracket $A^2$ at the front of the bed-plate A, and a cam $B^2$, which is secured upon and rotates with the shaft F and engages with such lever, said roller is moved to and held at the lower limit of its motion during all but a fraction of the time required for a rotation of said shaft.

Figure 13:
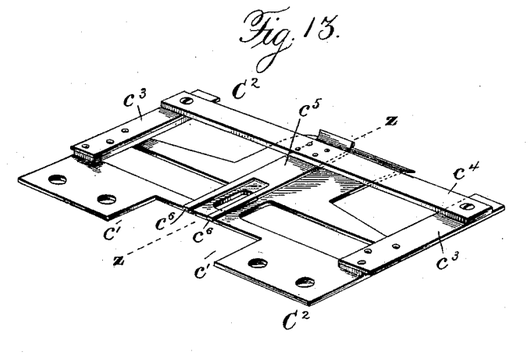
Fig. 13 is a perspective view of the bridge-plate used for guiding and supporting a blank during its passage from one pair of rolls to the other pair.
Figure 14:
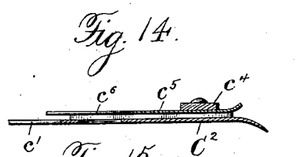
Fig. 14 is a section of the same on line $z\ z$ of Fig. 13.
Figure 15:
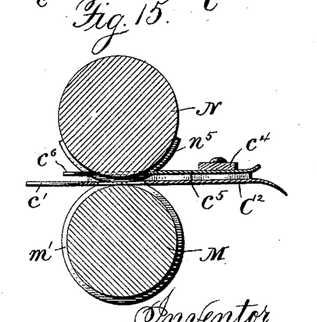
Fig. 15 is a like view of said plate and of the cutting-rollers as combined for use.
Figure 16:
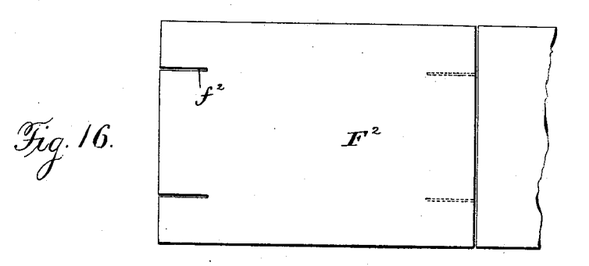
Fig. 16 is a plan view of a blank for an ordinary box having its front end completed and the longitudinal cuts in its rear end indicated by dotted lines.
Figure 17:
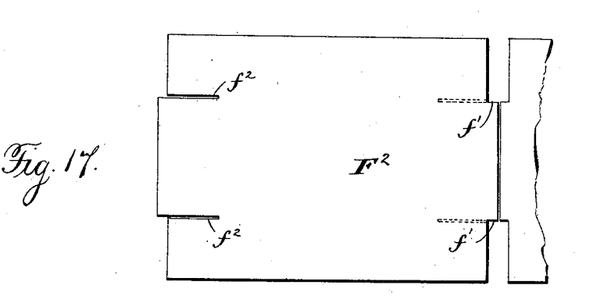
Fig. 17 is a like view of a blank for making a deeper box.
Figure 18:
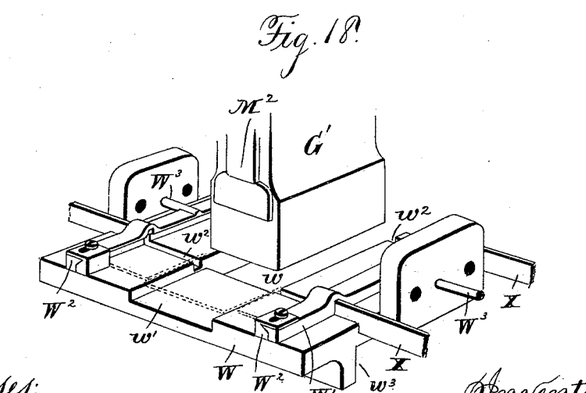
Fig. 18 is a perspective view of the box-forming mechanism in position to receive a blank.
Figure 19:
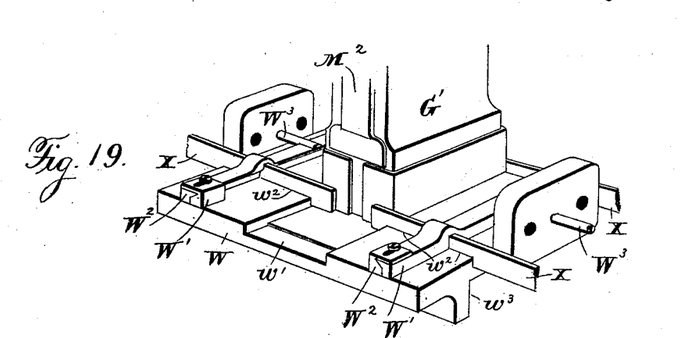
Fig. 19 is a like view of the same after the end dies have moved to position.
Figure 20:
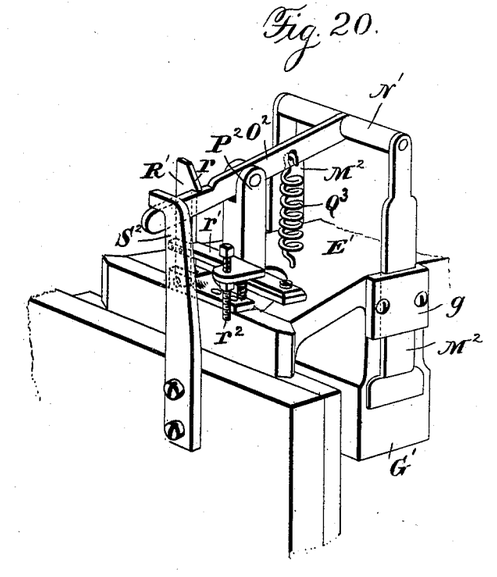
Fig. 20 is a perspective view of the mechanism employed for stripping the box from the plunger, showing its parts in their normal positions.

Secured to the rear side of the table W, and from thence extending rearward nearly to the rollers I and K, is a bridge-plate $C^2$, which has the general form shown in Fig. 13, its front central portion being provided with an opening $c'$ for the roller T'. Upon the upper side at each end of such plate is secured a strip $c^3$, which is arranged in a line with the feed, and to its rear end is secured a cross-strip $c^4$, which extends across and is attached to the corresponding end of the opposite strip. At the longitudinal center of such cross-strip is secured another cross-strip $c^5$, which from thence extends horizontally forward and has its front portion bifurcated, as shown, with its prongs $c^6$ and $c^6$, contained within the grooves $n^3$ $n^3$ of the roller N. Between said plate and its strips is left a sufficient space for the free passage of the paper-blank, and at their rear ends said plate and the central strip are relatively curved downward and rearward and upward and rearward to permit of the ready entrance of the end of a blank.

The box holders or carriers $H^2$ and $H^2$ are hinged together at their sides, so as to form a continuous chain, which has such length as to enable each box after having been deposited in a holder to remain therein a sufficient time before being discharged to insure the drying of the glue employed for fastening the ends. Said holders are moved successively to position beneath the plunger by means of a slide $D^2$, which is adapted to be moved longitudinally upon the way A' and is provided with a pawl $d'$, that extends over said chain of holders, and by the rearward movement of said slide is caused to trip over a holder, while upon the forward movement of the same said pawl will engage with such holder and move the entire chain forward. The movements described are secured by means of a cam $E^2$, which is secured upon the driving-shaft F and provided with a cam-flange $e'$, that passes between two rollers $d^2$ and $d^2$ upon the lower side of said slide.

In the use of the mechanisms described, paper for blanks is fed from a roll in the usual way between the rear pair of rolls H and H' and from the same passes to the rolls I and K, which cut off a blank $F^2$, and if the depth of the box is to be more than one-half its width cuts at the same time a right-angled notch $f'$ out of each corner of said blank. In shaping the rear end of and severing one blank said roller-dies at the same time shape the front end of the succeeding blank. The severed blank then passes into the bridge-plate $C^2$ and between the rollers M and N, during which the longitudinal cuts $f^2$ and $f^2$ are made, after which it passes upon the table W over the opening $w$. The plunger G' now descends sufficiently to cause the side edges of the blank to be turned upward, after which the pairs of bars X and X simultaneously move inward and turn the end pieces to a position at a right angle with said sides. Said plunger now continues its downward movement and, turning up the ends of the blank, presses the box into the holder H³ stationed beneath, and at the instant when it reaches the lower limit of its motion the former I' rises and impinges upon the bottom of the box, embosses such part, and completes the box. The plunger now rises and the strippers M² and M², which have moved downward until their ends are in engagement with the upper edges of the box ends, hold the box in position until the plunger has entirely withdrawn, when they are moved to their upper position and the completed box in its holder is moved out from the machine. The rollers I and K can only engage with and draw forward the paper when the elevated portions of their peripheries come together, and when they are relatively adjusted, so that circumferentially such raised portions exactly coincide, the rollers are adapted to draw forward and to cut off a blank which in length is just equal to the circumferential length of one of such portions, or one-half the circumference of one of such rollers. When it is desired to produce a shorter blank, so as to cause the box to have less depth, said roller K is turned so as to cause the front edge of its raised portion to be in advance of the front edge of the raised portion of said roller I, when the length of the blank will then only equal the distance between the points where the raised parts of said rollers first come together and the point where they separate. In order that the end of the paper strip may with certainty be grasped by the rollers I and K, the rollers H and H' are arranged to run slowly, so that between the time when a blank has been cut from the strip and the time when said rollers I and K have revolved sufficiently to bring the elevated portions of their peripheries together said strip will have been moved forward a short distance, so that its end will be in position to be grasped, after which the larger size and faster movements of said rollers I and K will cause said strip to be drawn rapidly forward, and said rollers H and H' will, through the action of their pawl and ratchet connection, be rotated by instead of feeding forward the paper. The cutting-rollers M and N run at a uniform speed, and from between the same the blank is passed forward until its end rests upon the table, after which the roller W⁴ rises into engagement with the lower face of such blank, and, pressing the latter upward against the toothed roller T', said blank is quickly moved forward to position for the action of the plunger. After a box-holder has received its box and has nearly completed the circuit, the box is by an ordinary pusher removed, and said holder is then in condition to receive another box.

It will be seen that the blank is entirely completed before it is placed in position for the action of the box-forming devices, and it is thus made possible to employ one machine in the manufacture of boxes of various sizes.

Having thus described my invention, what I claim is—

1. As an improvement in mechanism for forming blanks for paper boxes from a continuous strip of paper, the combination of a knife for transversely cutting the paper, means to vary the length of paper cut by the knife, and revolving, segment-shaped knives for forming slits in each end of the blank, each of which knives operates to cut slits in both ends of the blank, substantially as and for the purpose specified.

2. The combination with box-forming devices, of blank making mechanism comprising a knife for transversely cutting the paper, and revolving, segment-shaped knives for cutting slits in each end of the blank, each of which knives operates to cut slits in both ends of the blank, substantially as and for the purpose set forth.

3. In a paper box making machine, the combination with box forming devices, of a knife for transversely cutting the paper, and a roller between it and the box forming devices, which roller carries a knife to cut longitudinal slits at each end of the severed piece of paper, to complete a blank, substantially as and for the purpose shown.

4. In a box making machine, the combination of the blank forming mechanism, the box forming mechanism, the rollers forming part of said blank forming mechanism, the feed device between said rollers and the box forming mechanism, comprising a roller having a fixed axis and one having a movable axis, means for moving the latter roller toward and from the other and means for revolving one of said rollers, substantially as and for the purpose described.

5. In a paper box machine, the combination of the box forming mechanism, the feeding rollers, one of which is provided with a blank severing knife, a second set of rollers one of which carries blank slitting knives, and the supplemental, intermittently acting feed rollers, placed in close proximity to the box forming mechanism, substantially as and for the purpose specified.

6. In a box making machine, the combination of the blank forming mechanism, the box forming mechanism, the rollers forming part of said blank-forming mechanism, the feed device between said mechanisms comprising a roller having a fixed axis and one having a movable axis, connections between one of the rollers of the blank-forming mechanism, and the feed roller having a fixed axis, and means to move the other feed roller toward and from the latter, substantially as and for the purpose shown.

7. In a paper box making machine, the combination of box forming devices a pair of feed rollers, a knife carried by one of the latter, to cut the paper transversely, a second pair of rollers, having two knives, each of which is adapted to slit the paper longitudinally at both ends, and a bridge between the two pairs of rollers, substantially as and for the purpose described.

8. In a paper box making machine, the combination of a feed roller, gearing to rotate the same, a clutch device connecting it and such gearing that permits the roller to be moved faster than the rate at which such gearing drives it, and an intermittently feeding roller, that has greater peripheral speed than the other, substantially as and for the purpose specified.

9. The combination of the box forming plunger, a holder for the box blank into which the latter is carried by the plunger, the reciprocable strippers, and means to automatically impart a variable movement to the same, whereby they may engage the edges of boxes at different heights upon the plunger, to strip the boxes therefrom, substantially as and for the purpose shown.

10. In a paper box making machine the combination of the box forming plunger, means to fold the box blank thereon, a holder into which the folded blank is carried by the plunger, the reciprocable strippers, a spring to move the latter into engagement with the box edges, and cam mechanism to move said strippers in opposition to the spring, substantially as and for the purpose described.

11. In a paper box making machine, the combination of the box forming plunger, the reciprocable strippers, a spring to move the latter into engagement with the box edges, a latch mechanism to hold said strippers from movement by the spring, and means to release such latch mechanism, substantially as and for the purpose set forth.

12. In a paper box making machine, the combination of the box forming plunger, the reciprocable strippers, the lever connected to the latter, the spring to move said strippers in one direction, a pawl to engage said lever and hold the parts against the stress of the spring, and means to release the pawl at a predetermined time, substantially as and for the purpose specified.

13. In a paper box making machine, the combination of the box-forming plunger, the reciprocating strippers, the lever connected to the latter, the spring to move said strippers in one direction, a pawl to engage said lever and hold the same against the stress of the spring, means to release said pawl at a predetermined point in the descent of the plunger, and a lug to engage said lever to move such strippers in the opposite direction, substantially as and for the purpose shown.

In testimony that I claim the foregoing I have hereunto set my hand this 3d day of May, 1894.

JACOB P. WRIGHT.

Witnesses:
L. W. BEECHER,
H. D. STANNARD.